C. PECK.
FREIGHT CAR CONSTRUCTION.
APPLICATION FILED APR. 7, 1922.
1,428,448.
Patented Sept. 5, 1922.
3 SHEETS—SHEET 1.
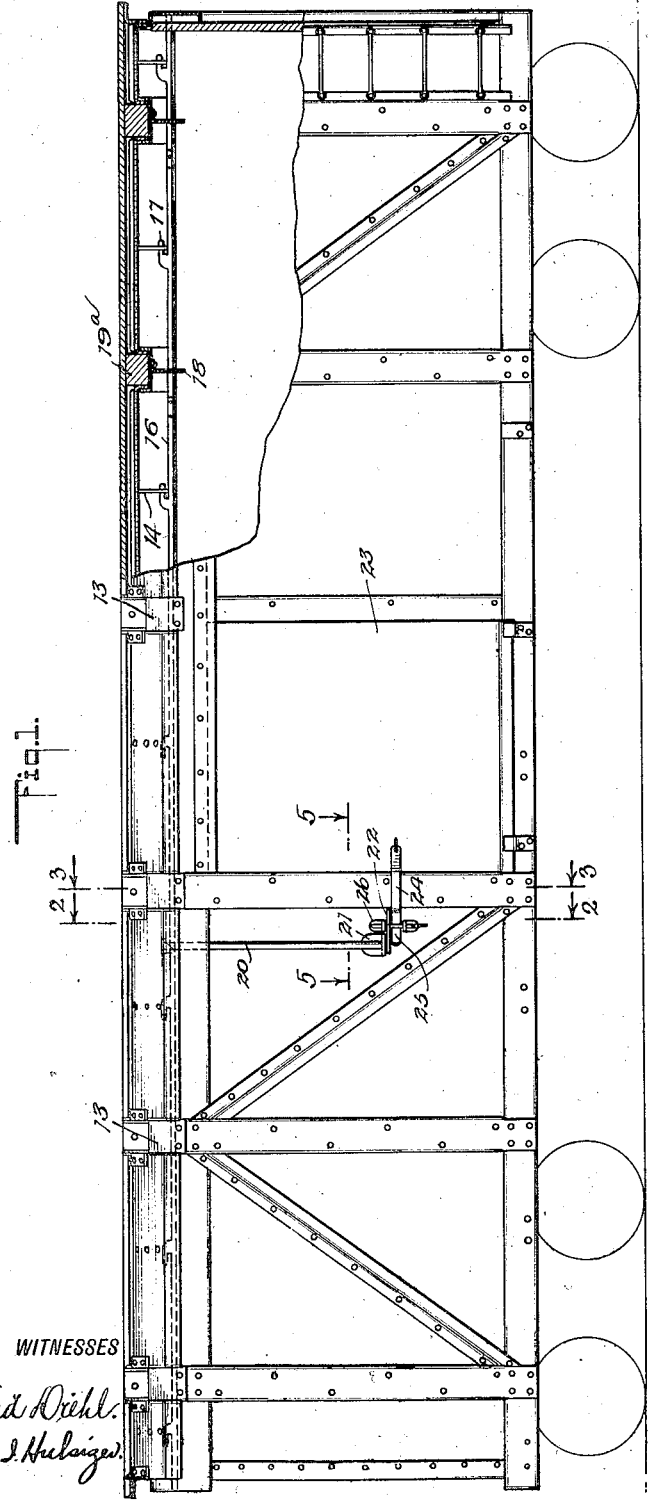
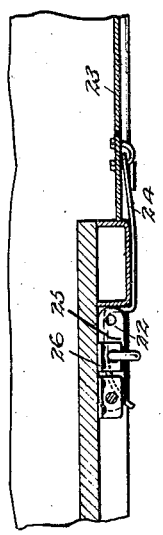
WITNESSES
INVENTOR
Calvin Peck
BY
ATTORNEYS

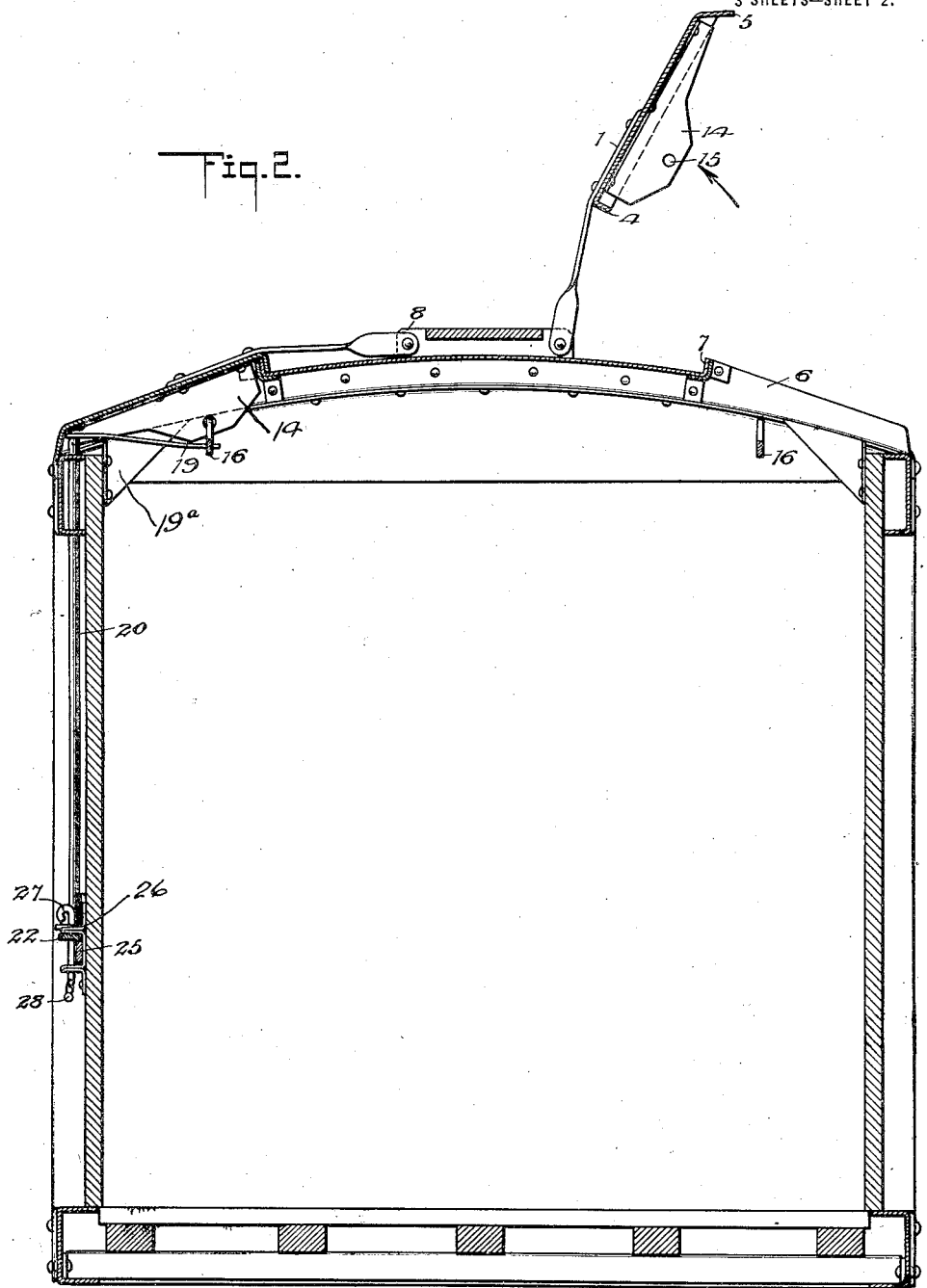

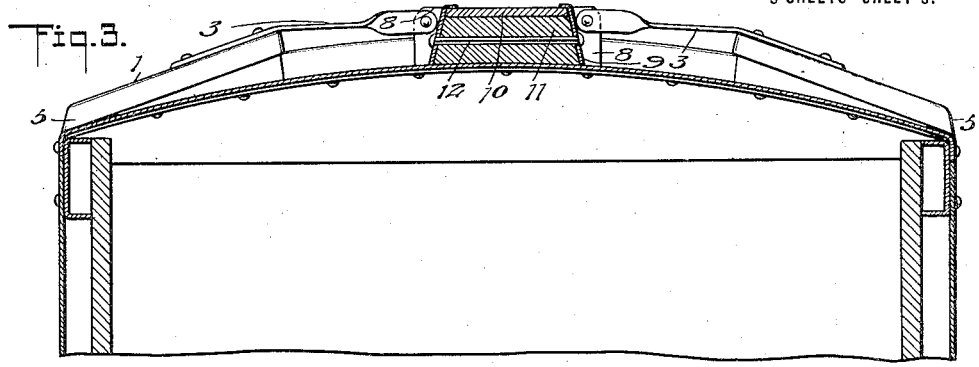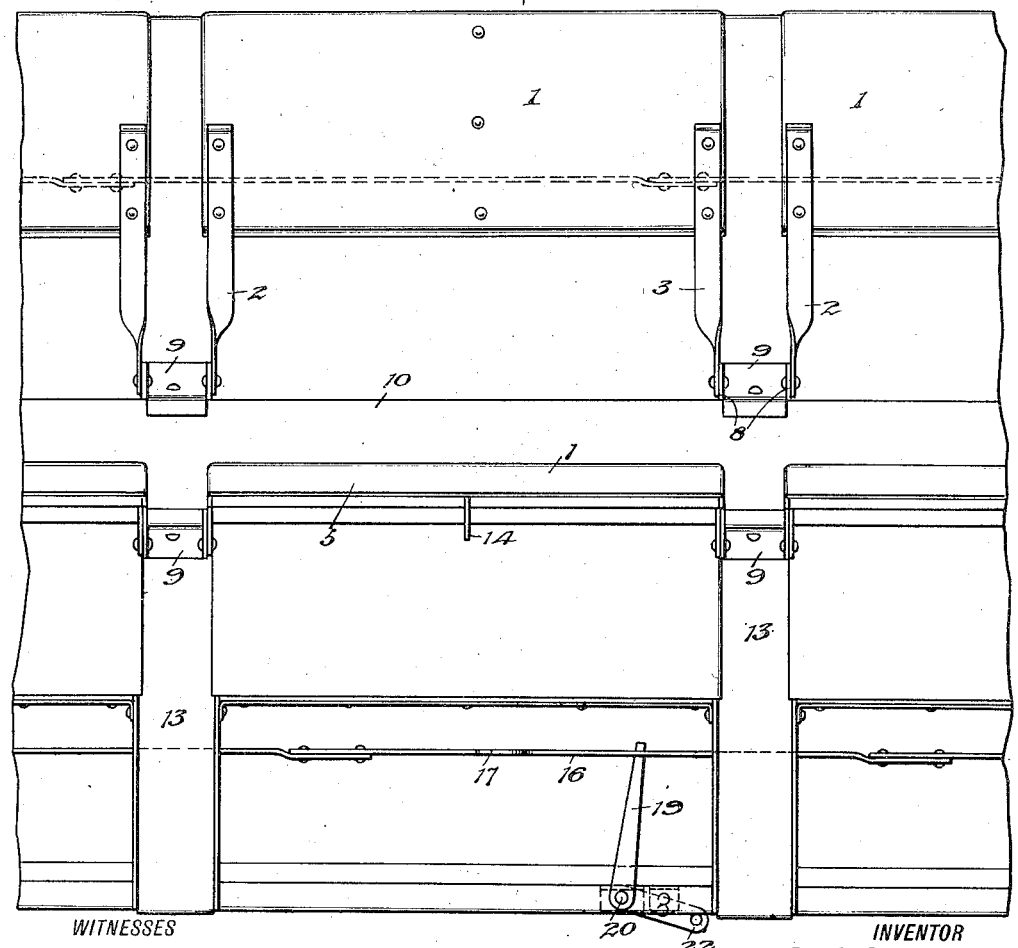

Patented Sept. 5, 1922.

1,428,448

UNITED STATES PATENT OFFICE.

CALVIN PECK, OF BLOOMFIELD, NEW JERSEY, ASSIGNOR OF ONE-HALF TO MASON F. GRYMES, OF ORANGE, NEW JERSEY.

FREIGHT-CAR CONSTRUCTION.

Application filed April 7, 1922. Serial No. 550,486.

*To all whom it may concern:*

Be it known that I, CALVIN PECK, a citizen of the United States, and a resident of Bloomfield, in the county of Essex and State of New Jersey, have invented a new and Improved Freight-Car Construction, of which the following is a full, clear, and exact description.

This invention relates to a freight car construction, and has for an object the provision of a car which can be readily used for carrying loads in separate units or in packages or in bulk.

Another object resides in the provision of means whereby if the car is used to carry a load in bulk the load can be very quickly and easily dumped therefrom by inverting the car.

A further object resides in the provision of a simple, strong, efficient construction and operating mechanism whereby a plurality of doors on the top of the car are quickly opened and efficiently locked in the closed position with a minimum amount of effort on the part of the operator.

A still further object resides in the provision of means whereby the car can be used at the same time to carry part of its load in bulk and part in separate packages or units.

Another object resides in the provision of means whereby the doors in the roof are permanently sealed against leakage.

A further object resides in the provision of means whereby the car construction is strengthened to enable the car to be properly gripped by any inverting apparatus without danger to the construction of the car.

A still further object resides in the particular construction and arrangement of parts which are hereinafter described and claimed and shown in the accompanying drawings.

The invention is illustrated in the drawings, of which—

Figure 1 is a side view of a freight car with a portion cut away.

Fig. 2 is a section taken on the line 2—2 of Fig. 1, showing in more detail the construction of the doors in the roof.

Fig. 3 is a similar section taken on the line 3—3 of Fig. 1 showing the roof doors in closed position.

Fig. 4 is a plan of a part of the top of the car showing some of the doors closed and others open.

Fig. 5 is a section taken on the line 5—5 of Fig. 1 showing in further detail the means whereby the locking mechanism is sealed against illegal use.

The form of the invention shown in the drawings is a preferred form, although it is understood that modifications in the construction and arrangement of the parts and in the character of the materials used may be adopted without departing from the spirit of the invention.

This invention comprises a freight car construction in which along the roof on each side thereof a plurality of doors 1 are pivoted on arms 2 and 3. These doors are provided with dependent, rear and side flange portions, such as 4, and a front dependent flange 5 adapted to co-operate with a hatchway such as 6. This hatchway has a raised lid or ledge portion 7 slightly elevated above the level of the roof of the car so that when the door is closed, as shown in the left side of Fig. 2, there is no possibility of a leakage through the door construction. The arms 2 and 3 which are connected to each door are pivoted on vertical flanges such as 8 formed on plates 9 disposed adjacent the ordinary walk or track 10 generally disposed down the middle of the roof of the car. As shown in Fig. 3, beneath the track 10, at the point where the plates 9 are fastened thereto, I dispose a block 11 of some material, such as wood, and a bolt 12 extends through this block 11 and connects the oppositely disposed plates 9 to make this construction rigid. Furthermore, the construction of the car is such as to form a sort of channel or groove, indicated by the numeral 13, across the car transversely between the doors. Whenever the car is disposed in association with apparatus to invert the same for the purpose of unloading a bulk load, generally cables are passed around the top of the car to rigidly hold it in association with the inverting apparatus, and these cables pass across the top to lie in the grooves or channels 13. Because of the strain on these cables contributed to the roof of the car, and especially on the path or track 10, the blocks 11 are especially necessary to prevent the path 10 from being broken.

As noted in Fig. 2 particularly, each door is provided with a dependent plate or flange 14 having an aperture 15 therein. These plates 14 and the apertures 15 in the doors on one side of the car are aligned so that a latch bar or rod 16 extending longitudinally along within the car and having latch fingers 17 thereon may co-operate with the plates 14 in such manner that the latch fingers 17 will engage in the apertures 15 so that the doors on that side of the car will be locked in their closed position. It will be understood, of course that there is another latch bar 16 on the opposite side of the car adapted to be associated with the doors on that side. In Fig. 1 it will be noticed that the latch bar 16 is supported at its ends and throughout its length to reciprocate. Flanged plates 18 are dependent from the studs or joists 19a in the roof of the car to act as supports for the bar 16.

In Fig. 2 a lever arm 19 is shown connected to the upper end of a rock bar 20. This lever is associated in any suitable aperture in the bar 16 so that when the lever 19 is moved the bar 16 moves therewith. The rocking bar or rod 20, as shown particularly in Fig. 1, extends down along the outside of the car, and the lower end is journaled on a bracket plate 21 and has on its lower end an operating arm 22.

The car at each side thereof is provided with the usual sliding door 23. This door has a hasp 24 bent over as at 25 normally to lie close against the car. A small bracket plate 26 lies adjacent the bracket plate 21 and the key or pin 27 passing through apertures in the bracket 26 and in the arm 22 will lock the arm 22 and by extending in front of the bent-over portion 25 of the hasp 24 will hold the hasp in this position, whereby the door 23 cannot be opened. Therefore, it will be readily seen that the single pin 27 will lock not only the door on the side of the car but will lock all the roof doors on that side of the car.

As shown in Fig. 2, the lower end of the pin 27 may be provided in the usual manner with a seal 28 so that this locking mechanism cannot be tampered with. It is preferable to provide each side of the roof of the car with a plurality of doors, several in fact, so that if conditions warrant, the interior of the car can be divided up by a plurality of partitions (not shown) so that the car can be used to carry in part a bulk load and a package load.

In the operation of the device, assuming that the car is loaded in bulk and locked, the seal 28 is broken and the pin 27 is removed. This permits the arm 22 to move outwardly and through the bar 20 reciprocating the bar 16 to remove the fingers 17 from the plate 14 of each door on that side only of the car. If this side only of the car is provided with a bulk load, the car can be inverted to remove the load in a very short space of time by disposing the car and fastening it to any suitable inverting apparatus. It is found, with the usual apparatus used in connection with unloading coal cars, that freight cars of this construction can be unloaded very much faster than is ordinarily the case and that many times the number of cars can be unloaded in a single work day than has hitherto been the case. As soon as the car is inverted, the doors 1 drop down in response to the action of gravity, and when the car is disposed in its normal uplifted position again the doors automatically close in response to the same force. Therefore, in loading and unloading a car it is merely necessary to unlock the doors and invert the car, the door action taking care of itself, and then when the car is disposed normally again, to merely move the locking mechanism to its closed position.

It will, therefore, be readily observed that I have provided a simple, efficient, strong easily operated construction in connection with a freight car whereby bulk loads or package loads may be, separately or in a combined manner, contained within a car. Furthermore, this construction permits of a very quick and simple unloading of a bulk load with a minimum requirement of attention on the part of the person operating the car.

What I claim is:

1. A freight car construction which comprises a plurality of pivoted doors in the roof of the car, a slidable latch member within the car, means on each door to be engaged by the latch member, and means outside the car to operate the latch member.

2. A freight car construction which comprises a plurality of pivoted doors in the roof of the car, a slidable latch bar, fingers on said latch bar engaging the doors, means on the doors to be engaged by the fingers, a rocking lever engaging the bar, a rocking shaft engaging the lever, and means outside the car engaging the rocking shaft to operate the same whereby the latch bar can be moved to engage the doors and to be disengaged therefrom.

3. A freight car construction which comprises a plurality of door hatches in the roof of the car having raised flanged portions above the level of the roof, a door disposed over each hatchway having dependent flanges cooperating with the flanges on the hatch or door opening to make a tight joint, and arms connected to the door and pivoted to the car roof, said doors opening by gravity when the car is inverted and closing in response to the same force when the car is returned to an upright position.

4. A freight car construction which comprises a roof and a plurality of doors pivoted thereto, the roof of the car having a plurality of transverse channels to receive and guide cables clamped around the car when the car is to be inverted.

5. A freight car construction which includes a pivoted door in the roof of the car, a slidable latch bar, a finger on said latch bar engaging the door, means on the door to be engaged by the finger, a locking lever engaging the bar, a rocking shaft engaging the lever, an operating arm on said shaft, a slidable door on the side of the car, a hasp on said door, and means engaging the operating lever and the hasp to hold the door in the top of the car and the sliding door locked.

CALVIN PECK.